US009772769B2

United States Patent
Shimazu

(10) Patent No.: US 9,772,769 B2
(45) Date of Patent: Sep. 26, 2017

(54) MOBILE TERMINAL DEVICE AND DISPLAY CONTROL METHOD THEREOF

(71) Applicant: KYOCERA Corporation, Fushimi-ku, Kyoto (JP)

(72) Inventor: Tomohiro Shimazu, Osaka (JP)

(73) Assignee: KYOCERA Corporation, Kyoto (JP)

( * ) Notice: Subject to any disclaimer, the term of this patent is extended or adjusted under 35 U.S.C. 154(b) by 78 days.

(21) Appl. No.: 14/523,821

(22) Filed: Oct. 24, 2014

(65) Prior Publication Data

US 2015/0042592 A1 Feb. 12, 2015

Related U.S. Application Data

(63) Continuation of application No. 13/327,596, filed on Dec. 15, 2011, now abandoned.

(30) Foreign Application Priority Data

Dec. 24, 2010 (JP) ................................ 2010-287960

(51) Int. Cl.
*G06F 3/0485* (2013.01)
*G06F 3/0488* (2013.01)

(52) U.S. Cl.
CPC ........ *G06F 3/04883* (2013.01); *G06F 3/0485* (2013.01)

(58) Field of Classification Search
None
See application file for complete search history.

(56) References Cited

U.S. PATENT DOCUMENTS

| | | | |
|---|---|---|---|
| 7,469,381 B2 * | 12/2008 | Ording | G06F 3/0485 715/702 |
| 2003/0122787 A1 | 7/2003 | Zimmerman et al. | |
| 2004/0125088 A1 * | 7/2004 | Zimmerman | G06F 3/04883 345/173 |
| 2007/0260994 A1 | 11/2007 | Sciammarella et al. | |
| 2008/0165141 A1 * | 7/2008 | Christie | G06F 3/044 345/173 |
| 2010/0125786 A1 * | 5/2010 | Ozawa | G06F 3/04845 715/702 |

(Continued)

FOREIGN PATENT DOCUMENTS

| | | | |
|---|---|---|---|
| JP | 2009104649 A | 5/2009 | |
| JP | 2009289101 A | 12/2009 | |
| JP | 2010259028 A | 11/2010 | |

OTHER PUBLICATIONS

Office Action dated May 8, 2014 issued in counterpart Japanese patent application No. 2010-287960.

(Continued)

*Primary Examiner* — Yu Chen
(74) *Attorney, Agent, or Firm* — Procopio Cory Hargreaves and Savitch LLP

(57) ABSTRACT

A mobile terminal device includes a display part, a receiving part that receives an operation to cause an image group displayed in the display part to transition, and a display controller that controls the display part such that the image group displayed in the display part makes transition based on the operation. When the image group is caused to transition, the display controller reduces an image constituting the image group and increases the number of images displayed in the display part.

12 Claims, 13 Drawing Sheets

(56) References Cited

U.S. PATENT DOCUMENTS

| | | | |
|---|---|---|---|
| 2010/0269038 A1* | 10/2010 | Tsuda | G06F 3/04886 715/702 |
| 2011/0010658 A1 | 1/2011 | Nash et al. | |
| 2011/0061025 A1* | 3/2011 | Walline | G06F 3/0485 715/830 |
| 2011/0119578 A1 | 5/2011 | Schwartz | |
| 2011/0154196 A1 | 6/2011 | Icho et al. | |
| 2011/0193857 A1* | 8/2011 | Filippov | G06F 9/4443 345/419 |
| 2012/0159364 A1 | 6/2012 | Hyun | |

OTHER PUBLICATIONS

Zennand, Tina (The Most Attractive Papervision 30 Galleries, DesignWebKit.com, Jun. 28, 2010).

Nickinson, Phil ("Review: SPB Mobile Shell 3.5", Windows Phone Central, Sep. 29, 2009).

\* cited by examiner

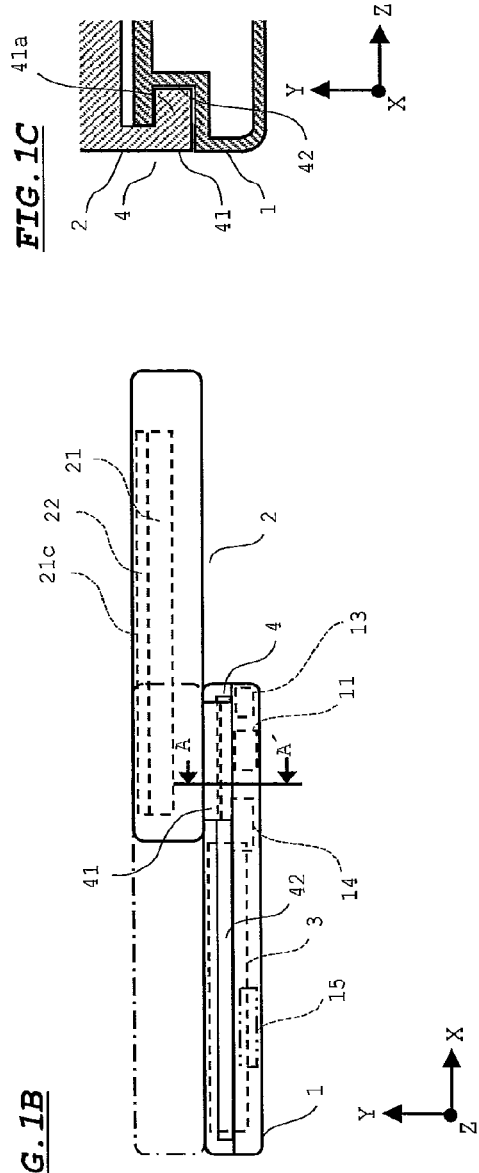
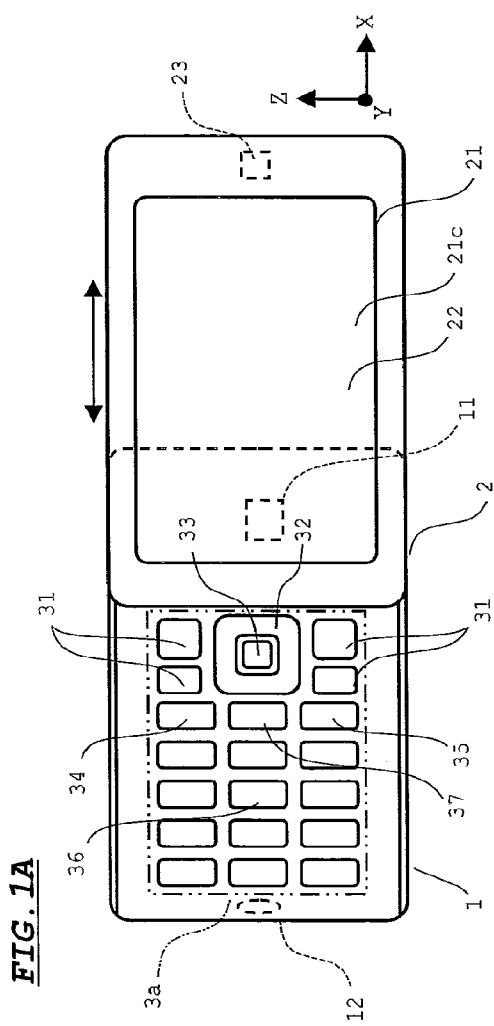
FIG. 1A
FIG. 1B
FIG. 1C

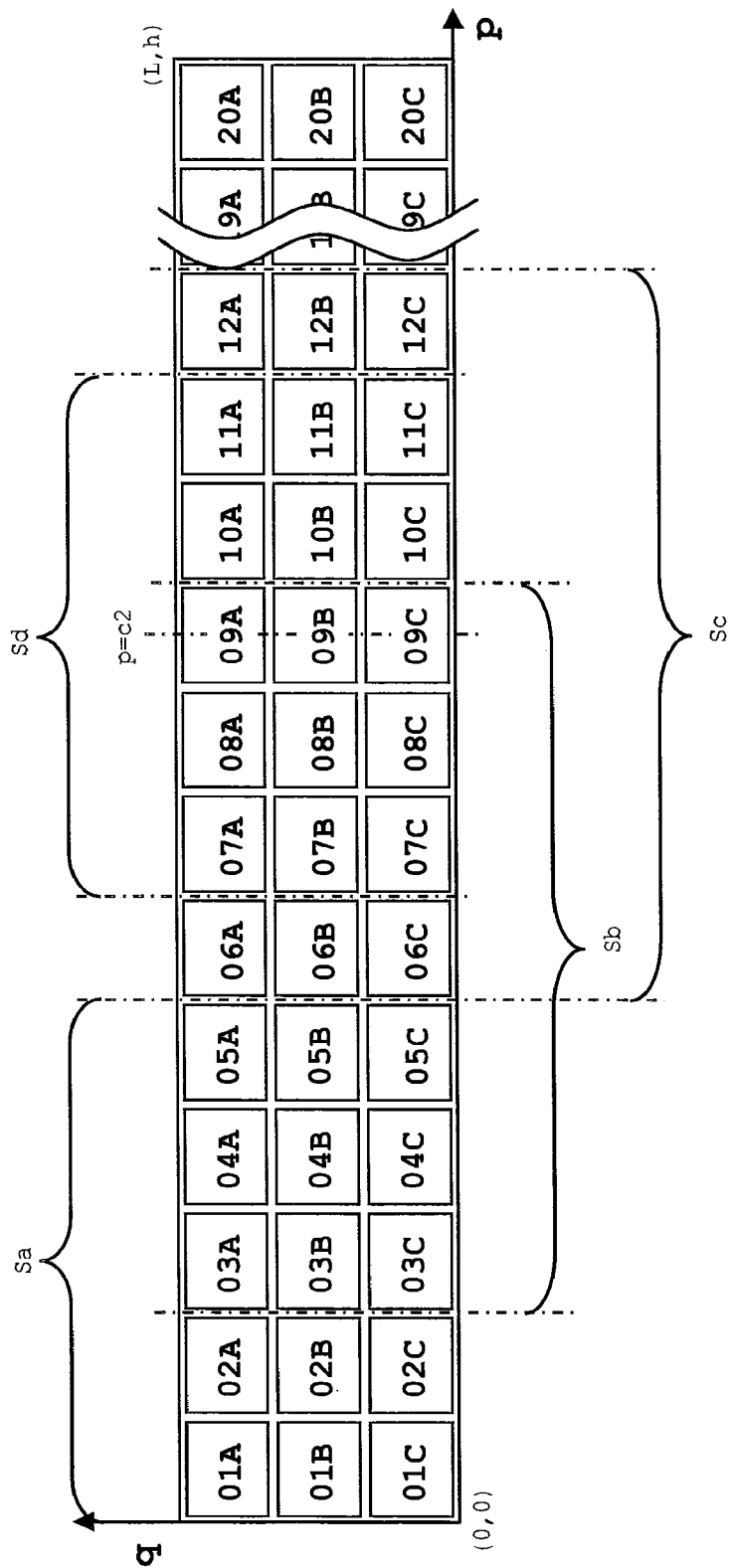
FIG. 4 THUMBNAIL TABLE

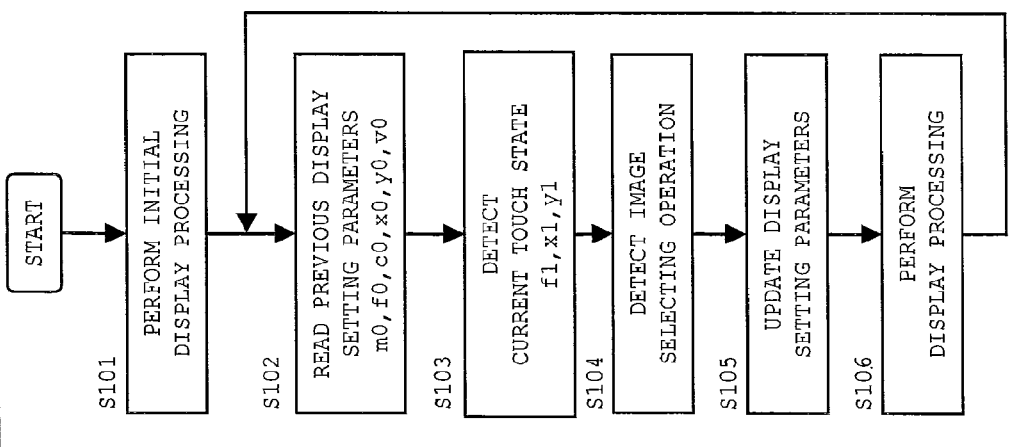

FIG. 5B

| DISPLAY SETTING PARAMETER | VALUE | DEFAULT VALUE |
|---|---|---|
| TOUCH STATE f | 0: RELEASE<br>1: TOUCH | 0 |
| TOUCH COORDINATES x,y | $0 \leq x \leq 2w$,<br>$0 \leq y \leq h$ | (UNDEFINED) |
| SCREEN CENTER COORDINATE c | $0 \leq c \leq L$ | w |
| SCROLL SPEED v | ARBITRARY | 0 |
| DISPLAY MODE m | 0: NORMAL MODE<br>1: SCAN MODE | 0 |

FIG. 5A

- START
- S101 PERFORM INITIAL DISPLAY PROCESSING
- S102 READ PREVIOUS DISPLAY SETTING PARAMETERS m0,f0,c0,x0,y0,v0
- S103 DETECT CURRENT TOUCH STATE f1,x1,y1
- S104 DETECT IMAGE SELECTING OPERATION
- S105 UPDATE DISPLAY SETTING PARAMETERS
- S106 PERFORM DISPLAY PROCESSING

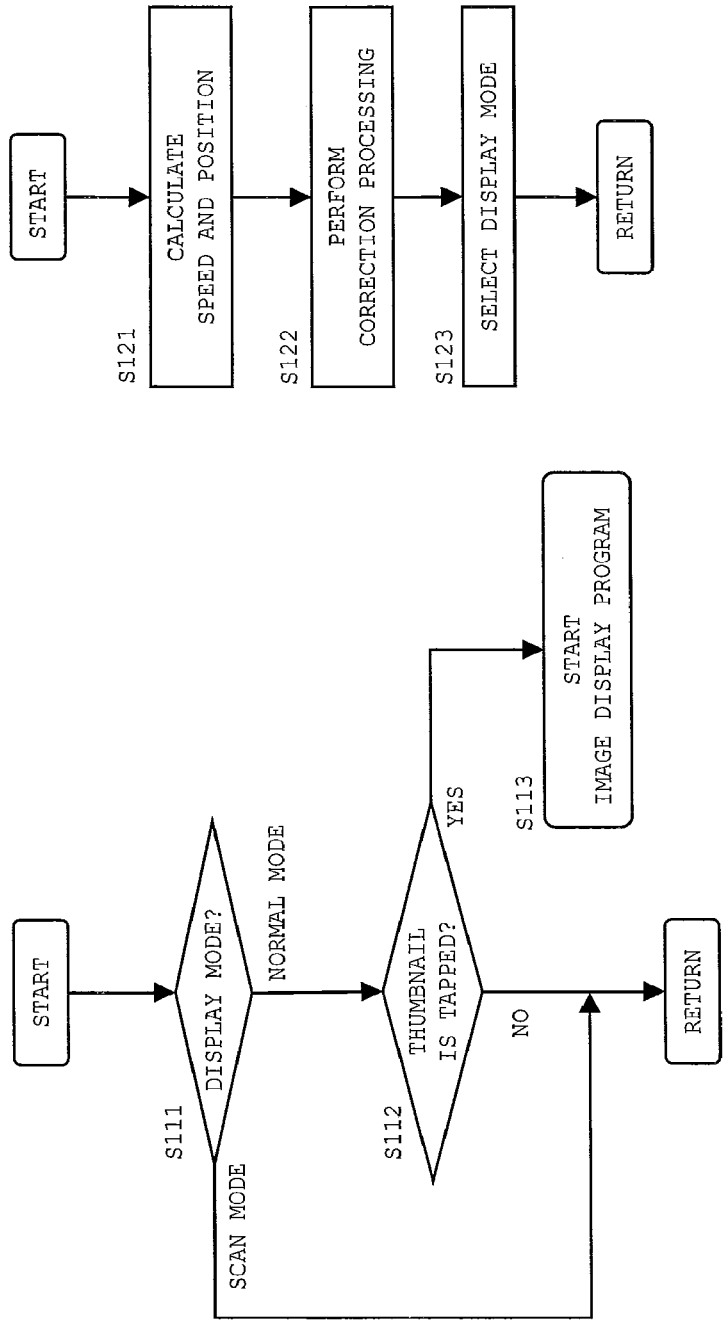

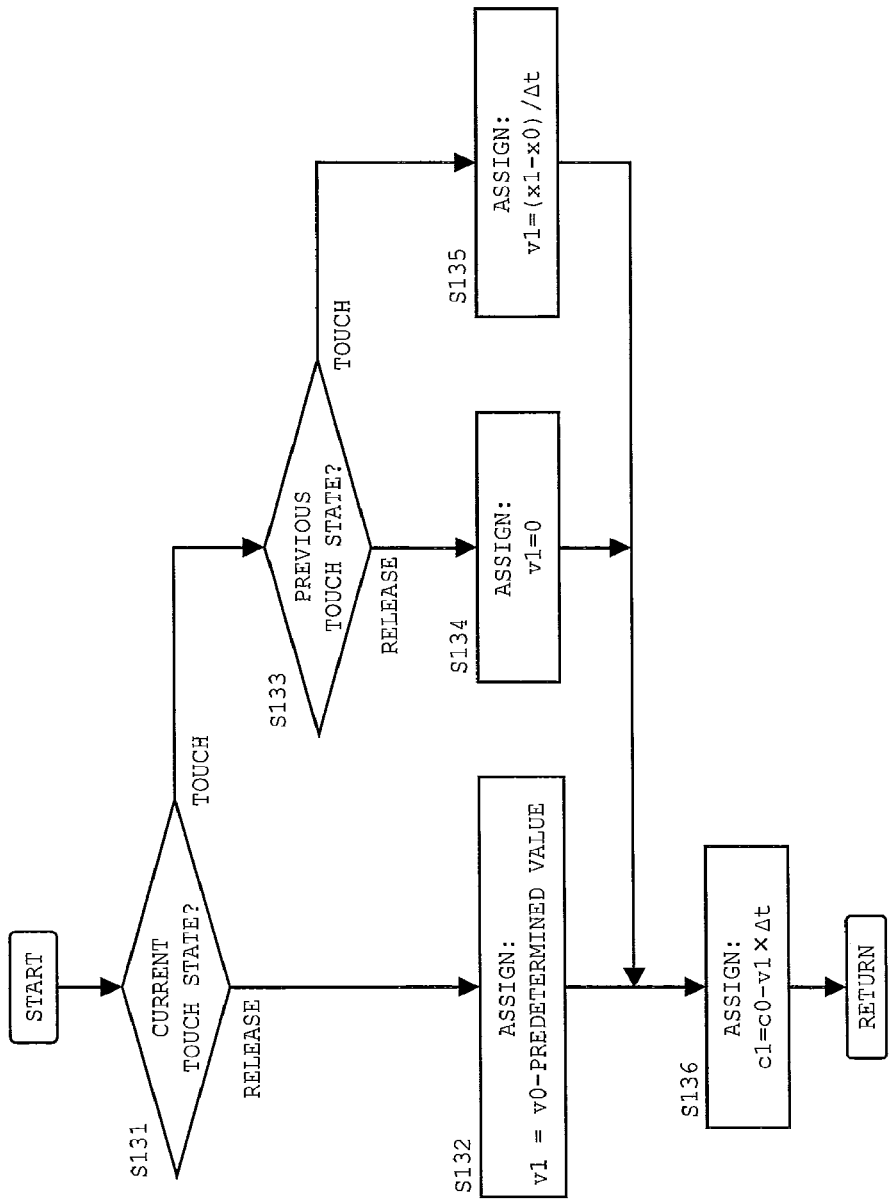
FIG. 8 SPEED AND POSITION CALCULATION PROCESSING

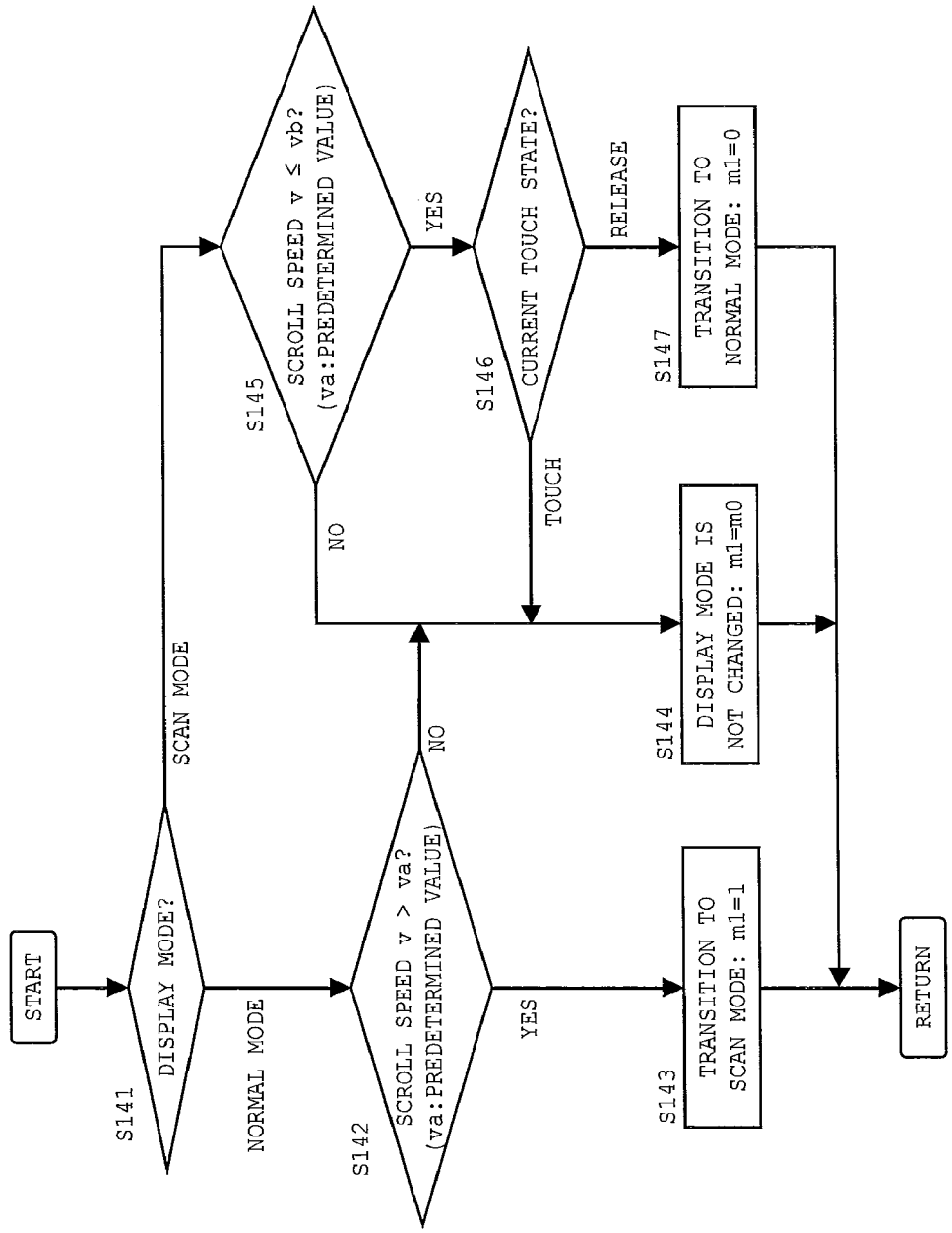
FIG. 9 DISPLAY MODE SELECTING PROCESSING

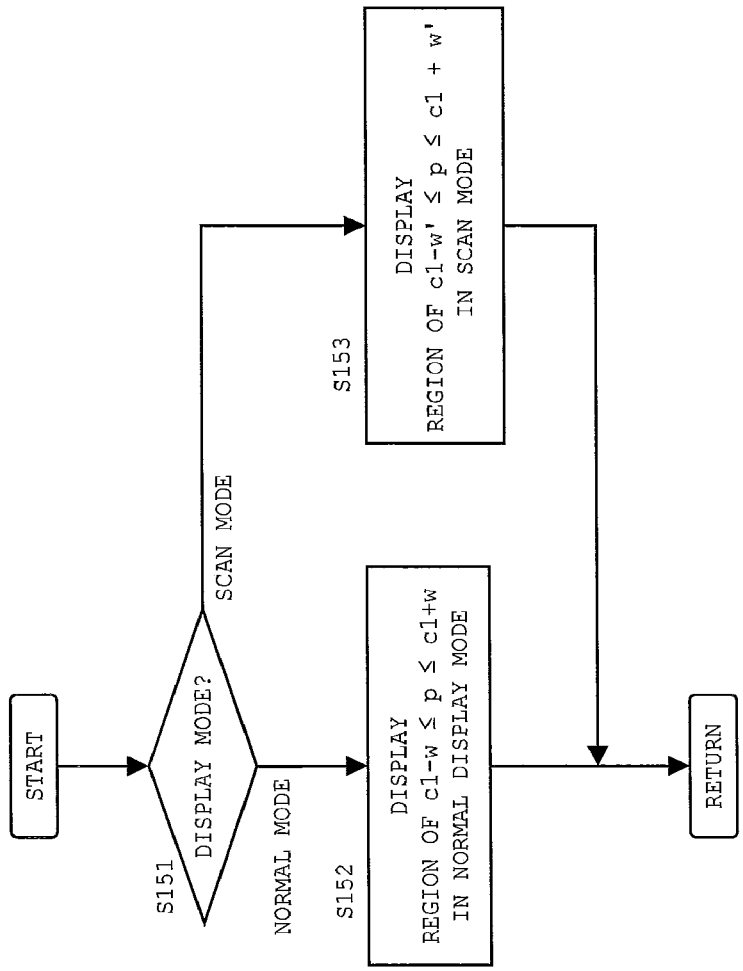
FIG. 10 DISPLAY PROCESSING

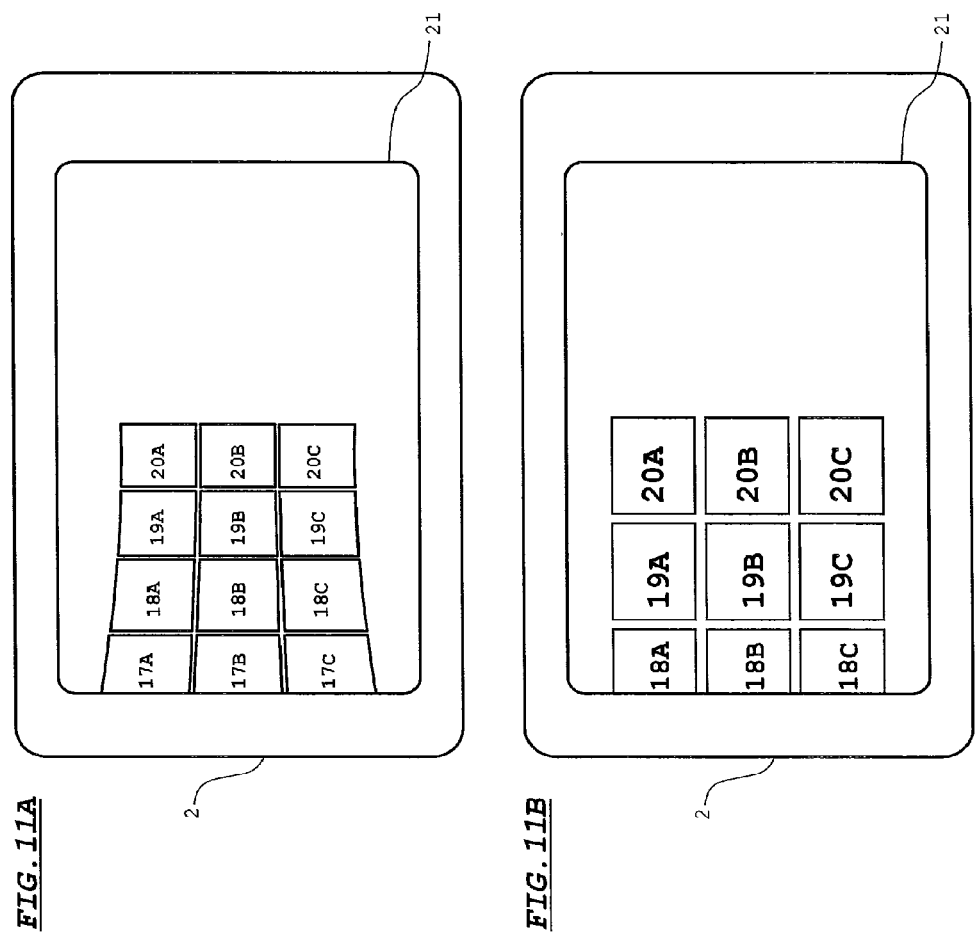

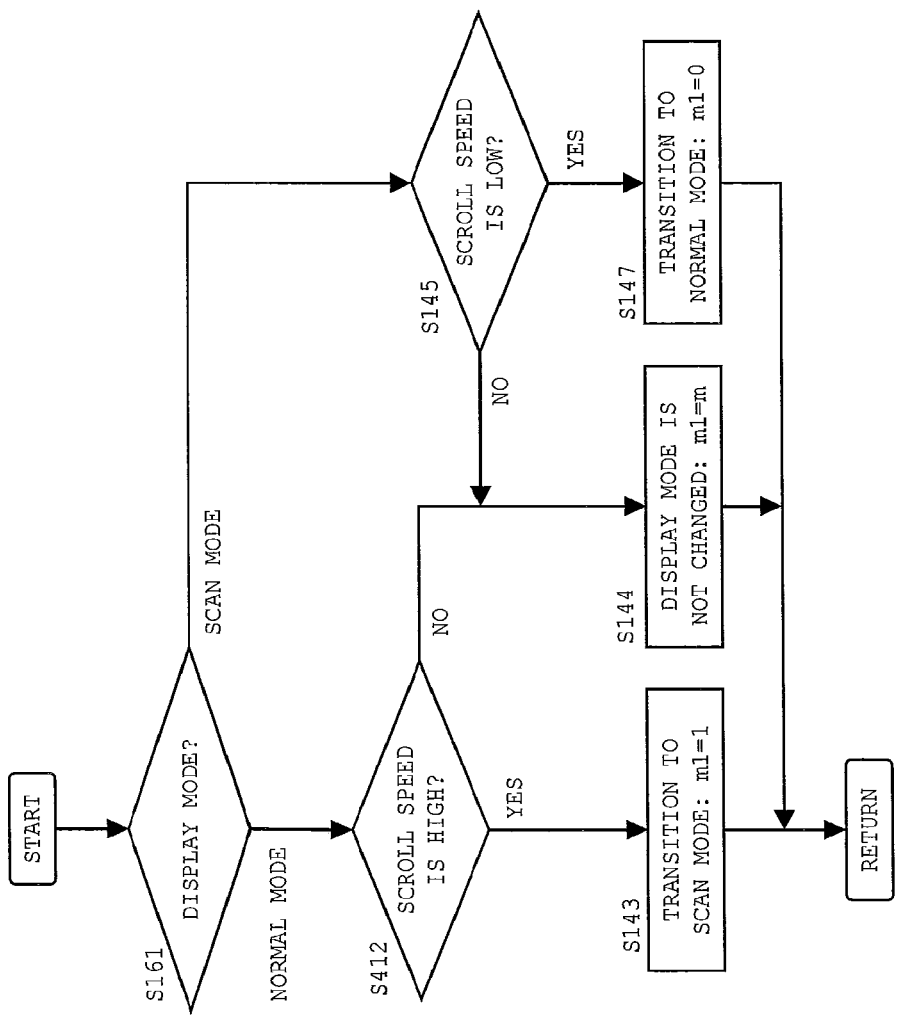
FIG.12 DISPLAY MODE SELECTING PROCESSING (FIRST MODIFICATION)

MOBILE TERMINAL DEVICE AND DISPLAY CONTROL METHOD THEREOF

This application is a continuation of U.S. application Ser. No. 13/327,596, filed Dec. 15, 2011 which claims priority under 35 U.S.C. Section 119 of Japanese Patent Application No. 2010-287960 filed Dec. 24, 2010, entitled "MOBILE TERMINAL DEVICE"; each of the above applications is incorporated herein by reference.

BACKGROUND OF THE INVENTION

1. Field of the Invention

The present invention relates to a mobile terminal device such as a mobile phone, a PDA (Personal Digital Assistant), and a tablet PC, and particularly to a mobile terminal device having a scroll function.

2. Description of the Related Art

Conventionally, in the mobile terminal device such as the mobile phone, a scroll function is provided to sequentially display recorded images on a display.

For example, a user scrolls the recorded images in order to browse a desired image. Therefore, the user may search the image, which is not displayed on the display, from the plurality of recorded images.

However, in scroll processing, when the plurality of images are stored, it is necessary to frequently perform a scroll operation in order to search the desired image, and it may be difficult to search the desired image.

SUMMARY OF THE INVENTION

A first aspect of the invention relates to a mobile terminal device. A mobile terminal device according to the first aspect includes: a display part; a receiving part that receives an operation to cause an image group displayed in the display part to transition; and a display controller that controls the display part such that the image group displayed in the display part makes transition based on the operation. The display controller reduces an image constituting the image group and increases the number of images displayed in the display part when the image group is caused to transition.

A second aspect of the invention relates to a method for controlling display of a mobile terminal device, which includes a display part and a receiving part that receives an operation to cause an image group displayed in the display part to transition. The method for controlling display according to the second aspect includes a transition step of causing the image group displayed in the display part to transition based on the operation. The transition step includes a step of reducing an image constituting the image group and increasing the number of images displayed in the display part when the image group is caused to transition.

BRIEF DESCRIPTION OF THE DRAWINGS

The above and other objects, features, and advantages of the present invention will become more apparent from the following description of preferred embodiments of the invention in conjunction with the accompanying drawings, in which:

FIGS. 1A to 1C are views illustrating an appearance configuration of a mobile phone according to an embodiment;

FIG. 4 is a view describing image data of the embodiment;

FIG. 5A is a flowchart illustrating a procedure of control processing for displaying a thumbnail table on the display surface of the embodiment, and FIG. 5B is a table describing parameters used to display the thumbnail table;

FIGS. 7A and 7B are flowcharts illustrating the procedure of the control processing of the embodiment;

FIG. 8 is the flowchart illustrating the procedure of the control processing of the embodiment;

FIG. 9 is the flowchart illustrating the procedure of the control processing of the embodiment;

FIG. 10 is the flowchart illustrating the procedure of the control processing of the embodiment;

FIGS. 11A and 11B are views schematically illustrating contents of the embodiment displayed on the display surface;

FIG. 12 is a flowchart illustrating a procedure of control processing according to a first modification.

Figure 2:
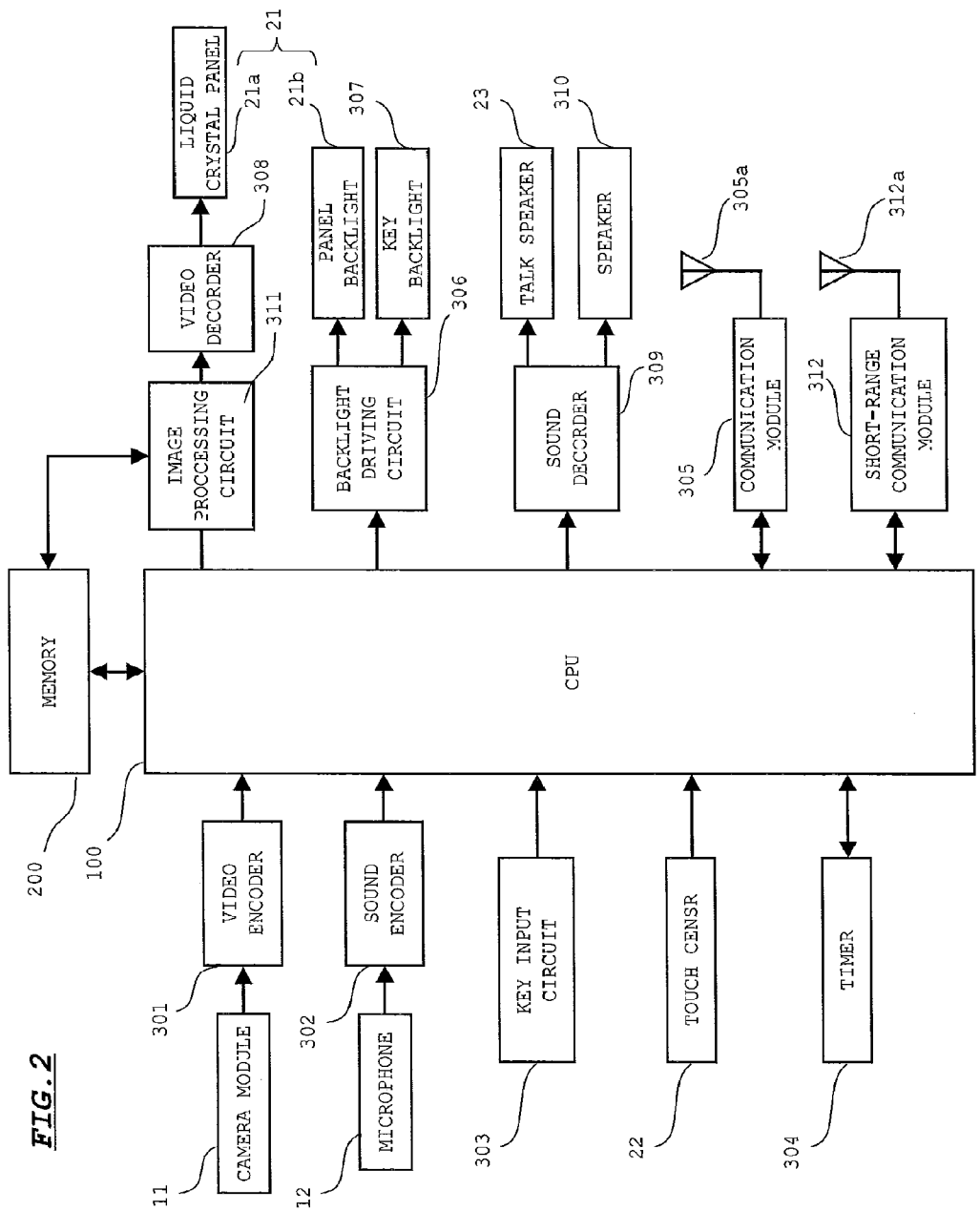
FIG. 2 is a block diagram illustrating an entire configuration of the mobile phone of the embodiment.

It is to be understood that these drawings are only illustrative, and not limiting the scope of the present invention.

DESCRIPTION OF PREFERRED EMBODIMENTS

Hereinafter, an embodiment of the present invention will be described with reference to the drawings.

In the present embodiment, a display 21 corresponds to the "display part" described in the claims. A touch sensor 22 corresponds to the "receiving part" described in the claims. A CPU 100 corresponds to the "display controller" described in the claims. A thumbnail and an icon correspond to the "image" described in the claims. A thumbnail table corresponds to the "image group" described in the claims. Steps S105 and S106 correspond the "transition step" described in the claims, and step S153 is equivalent to the "step" described in the claims. The correspondence between the claims and the embodiment are described only by way of example, and the claims are not limited to the embodiment.

FIGS. 1A to 1C are views illustrating an appearance configuration of a mobile phone. The mobile phone includes a first cabinet 1 and a second cabinet 2.

FIG. 1A is a front view illustrating the mobile phone in a state in which the second cabinet 2 is opened, and FIG. 1B is a side view illustrating the mobile phone in the same state. FIG. 1C is a sectional view taken along line A-A' of FIG. 1B.

A key input unit 3 is provided in the first cabinet 1. The key input unit 3 detects various input operations of the mobile phone.

An operation key group 3a constituting the key input unit 3 is provided in an upper surface of the first cabinet 1. The operation key group 3a includes four start keys 31, a direction key 32, a decision key 33, a talk key 34, a clearing key 35, twelve numerical keys 36, and a clear key 37.

The start key 31 is mainly operated in starting specific applications such as an electronic mail function, a telephone directory function, and a web function. The direction key 32 is mainly operated in selecting a desired menu from various menus displayed on the display 21. The decision key 33 is mainly operated in confirming the selection of the menu or in agreeing (OK) with a content displayed on the display 21. The talk key 34 is mainly operated in starting a telephone call, and the clearing key 35 is mainly operated in ending the telephone call. The numerical keys 36 are mainly operated in inputting characters (hiragana, katakana, and alphabet), numerical characters, and symbols. The clear key 37 is mainly operated in deleting the input characters and the like. Some functions of the numerical keys 36 may be implemented by QWERTY keys.

A camera module 11 is provided in the first cabinet 1. A lens window of the camera module 11 is provided in a rear surface of the first cabinet 1, and an image of a subject is captured in the camera module 11 through the lens window.

The display 21 is provided in the second cabinet 2. The display 21 includes a liquid crystal panel 21a and a panel backlight 21b that illuminates the liquid crystal panel 21a. The liquid crystal panel 21a includes a display surface 21c on which the image is displayed, and the display surface 21c is exposed to the outside. A touch sensor 22 is provided on the display surface 21c. Another display element such as an organic EL may be used instead of the liquid crystal panel 21a.

The touch sensor 22 is formed into a transparent sheet shape. The display surface 21c may be seen through the touch sensor 22. The touch sensor 22 includes first transparent electrodes that are disposed in a matrix array, a second transparent electrode, and a cover. The touch sensor 22 detects a change in electrostatic capacitance between the first and second transparent electrodes to detect a position on the display surface 21c that the user touches (hereinafter referred to as an "input position"), and the touch sensor 22 outputs a position signal corresponding to the input position to a CPU 100, which is described later. The touch sensor 22 corresponds to the receiving part that receives the input of the user on the display surface 21c. The touch sensor 22 is not limited to the electrostatic-capacitance touch sensor 22, but may be an ultrasonic touch sensor 22 or a pressure-sensitive touch sensor 22.

Examples of a form in which the user touches the display surface 21c include "touch", "slide", "tap", and "flick". The "touch" refers to an action in which the user does not move a contact member such as a pen or a finger while contacting the display surface 21c. The "slide" refers to an action in which the user moves the contact member or the finger while contacting the display surface 21c. The "tap" refers to an action, in which the user touches the display surface 21c with the contact member or the finger in a certain position so as to tap the display surface 21c with the contact member or the finger, and releases the contact member or the finger from the display surface 21c in a short time. The "flick" refers to an action, in which the user quickly slides the contact member or the finger along the display surface 21c and then releases the contact member or the finger from the display surface 21c, namely, the user moves the contact member or the finger in a short time while contacting the display surface 21c with the contact member or the finger, and releases the contact member or the finger from the display surface 21c.

A microphone 12 is provided in the first cabinet 1, and a talk speaker 23 is provided in the second cabinet 2. The user brings a mouth close to the microphone 12 while bringing an ear close to the talk speaker 23, which allows the user to make a telephone call.

The second cabinet 2 is coupled to the first cabinet 1 by a slide mechanism 4 while being slidable in an X-axis direction of FIG. 1B with respect to the first cabinet 1. As illustrated in FIG. 1C, the slide mechanism 4 includes a guide plate 41 and a guide groove 42. The guide plates 41 are provided in both end portions of the rear surface of the second cabinet 2, and projected stripes 41a are provided at lower ends of the guide plates 41. The guide groove 42 is formed along a slide direction (X-axis direction of FIG. 1B) in a side surface of the first cabinet 1. The projected stripe 41a of the guide plate 41 is engaged with the guide groove 42.

In the state in which the mobile phone is closed, the second cabinet 2 substantially completely overlaps the first cabinet 1 as illustrated by an alternate long and short dash line of FIG. 1B. In this closed state, all the keys of the operation key group 3a are hidden behind the second cabinet 2. The second cabinet 2 may slide (opened state) until the guide plates 41 reach a terminal end position of the guide grooves 42. When the second cabinet 2 is completely opened, all the keys of the operation key group 3a are exposed to the outside as illustrated in FIG. 1A.

In the state in which all the keys are hidden, the operation input of the mobile phone may be performed by the touch sensor 22 instead of the key operation input. At this point, an image of a soft key is displayed in a predetermined position on the display surface 21c of the display 21.

An operation key different from the operation key group 3a may be provided in a position in which the operation key is operable from the outside even if the second cabinet 2 is completely closed, for example, in the side surface of the first cabinet 1. Therefore, even if the second cabinet 2 is completely closed, the desired operation may be performed using such an operation key.

FIG. 2 is a block diagram illustrating an entire configuration of the mobile phone.

In addition to the above components, the mobile phone of the present embodiment includes the CPU 100, a memory 200, a video encoder 301, a sound encoder 302, a key input circuit 303, a timer 304, a communication module 305, a backlight driving circuit 306, a key backlight 307, a video decoder 308, a sound decoder 309, an external speaker 310, an image processing circuit 311, and a short-range communication module 312.

The camera module 11 includes an imaging element such as a CCD. The camera module 11 digitizes an imaging signal output from the imaging element, performs various corrections such as a gamma correction to the imaging signal, and outputs the corrected imaging signal to the video encoder 301. The video encoder 301 performs encoding processing to the imaging signal output from the camera module 11, and outputs the imaging signal to the CPU 100.

The microphone 12 converts collected sound into a sound signal, and outputs the sound signal to the sound encoder 302. The sound encoder 302 converts the analog sound signal output from the microphone 12 into the digital sound signal, performs the encoding processing to the digital sound signal, and outputs the digital sound signal to the CPU 100.

When each key of the operation key group 3a is operated, the key input circuit 303 outputs the input signal corresponding to each key to the CPU 100.

The timer 304 measures time. The CPU 100 acquires a signal indicating passage of the time from the timer 304 in order to control each unit of the mobile phone.

The communication module 305 converts the sound signal, the image signal, and a text signal from the CPU 100 into a radio signal, and transmits the radio signal to a base station through an antenna 305a. The communication module 305 converts the radio signal received through the antenna 305a into the sound signal, the image signal, and the text signal, and outputs the sound signal, the image signal, and the text signal to the CPU 100.

In response to a control signal input from the CPU 100, the backlight driving circuit 306 supplies power to the key backlight 307 and the panel backlight 21b, or stops the supply of the power thereto.

The supply of the power from the backlight driving circuit 306 lights on the key backlight 307, and the key backlight 307 illuminates each key of the operation key group 3a. The supply of the power from the backlight driving circuit 306 lights on the panel backlight 21b, and the panel backlight 21b illuminates the liquid crystal panel 21a.

The sound decoder 309 performs decoding processing to the sound signal from the CPU 100, converts the sound signal into the analog sound signal, and outputs the analog sound signal to the talk speaker 23. The sound decoder 309 performs the decoding processing to various notification sounds such as a ringtone and an alarm sound from the CPU 100, converts the notification sound into the analog sound signal, and outputs the analog sound signal to the external speaker 310. The talk speaker 23 regenerates the sound signal from the sound decoder 309 as the sound. The external speaker 310 regenerates the ringtone from the sound decoder 309.

The mobile phone also includes a short-range communication module 312 and an antenna 312a for the purpose of short-range communication. The short-range communication module 312 conducts the short-range communication by Bluetooth (registered trademark). The short-range communication module 312 conducts communication through the antenna 312a with another communication device, which is located within a radius of tens meters and includes the Bluetooth communication function. The short-range communication module 312 converts the digital signal input from the CPU 100 into the radio signal pursuant to a Bluetooth standard, and transmits the radio signal through the antenna 312a. The short-range communication module 312 converts the radio signal received through the antenna 312a into the digital signal, and outputs the digital signal to the CPU 100.

The memory 200 includes a ROM and a RAM. Image data and data, which is generated in an intermediate stage in order to generate the image data, are stored in the memory 200 in addition to a control program that provides a control function to the CPU 100.

The image processing circuit 311 performs the generation and the output of the image data at high speed. The image processing circuit 311 includes a display processor and a VRAM (Video RAM). Based on the control signal input from the CPU 100, the display processor reads data in a predetermined region of the memory 200 to generate or transfer the image data.

The image processing circuit 311 writes the image data generated by the display processor in a predetermined region of the memory 200 or the VRAM. The image processing circuit 311 reads the image data from the VRAM in predetermined timing, and outputs, to the video decoder 308, a signal for displaying the image expressed by the image data on the display 21.

Figure 3B:
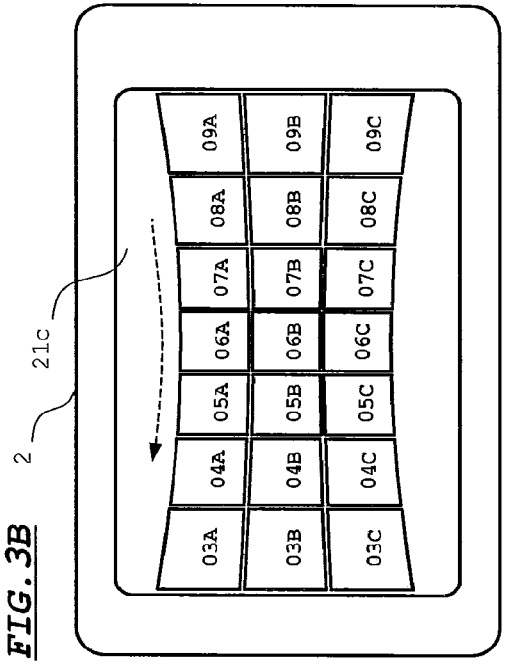
FIGS. 3A to 3D are views schematically illustrating contents of the embodiment displayed on a display surface.

The display processor performs processing for generating a predetermined image. For example, the display processor generates data of an image that seems to be stereoscopically curved (see FIG. 3B), from the image data in the memory 200. The display processor allocates each piece of pixel data of the image data in the memory 200 to a corresponding address in the VRAM according to a predetermined rule, and stores the pixel data in the VRAM. Accordingly, the image that seems to be stereoscopically curved is displayed on the display 21 as illustrated in FIG. 3B.

Referring to FIG. 2, based on the operation input signal from the key input circuit 303 and the touch sensor 22, the CPU 100 operates the camera module 11, the microphone 12, the communication module 305, the liquid crystal panel 21a, the talk speaker 23, the external speaker 310, the image processing circuit 311, and the short-range communication module 312 according to the control program. Accordingly, various functions (applications) such as the talk function, the electronic mail function, and the data transmitting and receiving function are performed.

The mobile phone of the present embodiment includes a function that displays a table in which a plurality of thumbnails are arrayed (hereinafter referred to as a "thumbnail table") while the thumbnail table may be scrolled. As used herein, the thumbnail refers to an image in which an original image is reduced to a predetermined size.

When browsing the image in a folder, the user performs an operation to display a list of the thumbnails on the display surface 21c. In response to the user's operation, the CPU 100 displays the thumbnail table, in which the thumbnails of the images stored in the folder are arrayed in a matrix, on the display surface 21c. When the user taps the desired thumbnail on the display surface 21c, the CPU 100 displays the image corresponding to the tapped thumbnail over the whole display surface 21c. The thumbnail may be previously created and stored in the memory 200. Alternatively, the thumbnail may be created when displaying the thumbnail table.

Due to a large number of thumbnails, a size of the thumbnail table may be larger than a size of the display surface 21c. In such cases, the user specifies the direction by the operation input such as the slide and the flick to the display surface 21c. In response to the user's operation input, the CPU 100 scrolls the thumbnail table in the specified direction on the display surface 21c. Therefore, the user may browse the thumbnail that is not displayed.

As used herein, the "scroll" means that the image or the image group (such as a thumbnail table and an icon group), which is displayed on the display surface 21c, is caused to transition integrally in a substantially uniform direction according to the user's operation input or the like. As described below with reference to an example of FIG. 3B, the "scroll" also means that the image or the image group, which is displayed on the display surface 21c, is caused to transition integrally in the substantially uniform direction on the display surface 21c so as to move along a curved surface in a three-dimensional space.

FIGS. 3A to 3D are views schematically illustrating contents of the present embodiment displayed on the display surface 21c. Before the description of the present embodiment, the general description will be made with reference to FIGS. 3A to 3D.

Figure 3D:
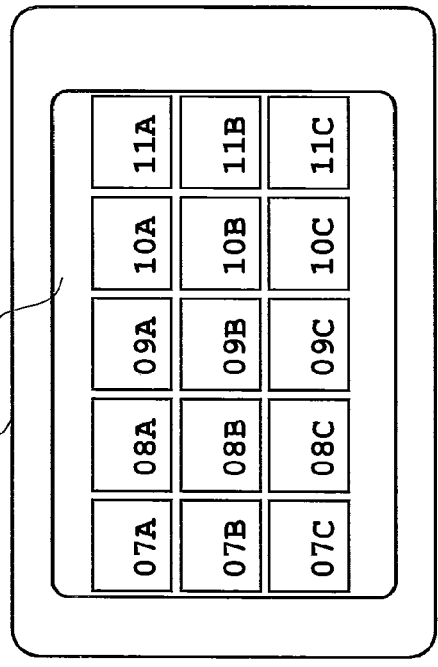
Figure 3A:
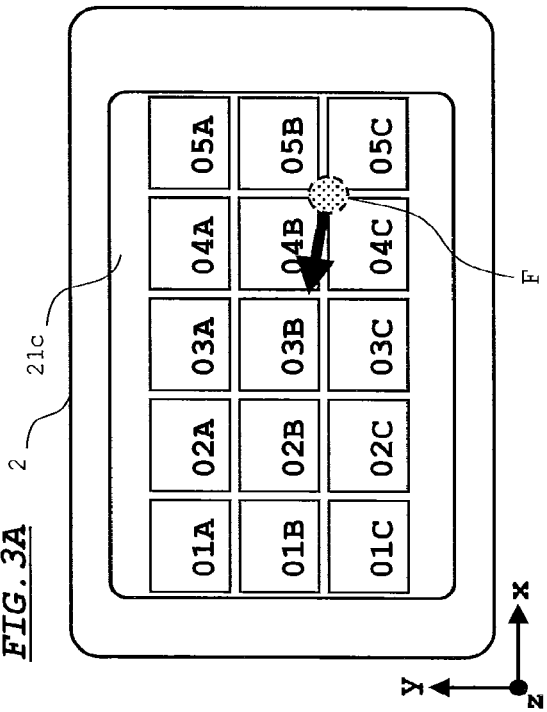

FIG. 3A is a view illustrating contents immediately after the thumbnail table is displayed on the display surface 21c. It is assumed that 60 images are stored in the folder selected by the user.

The CPU 100 arrays 60 thumbnails corresponding to the 60 images into a 3-by-20 matrix to generate the image data of the thumbnail table, and writes the image data of the thumbnail table in the memory 200.

FIG. 4 is a view illustrating a configuration of the image data of the thumbnail table. For the sake of convenience, it is assumed that a row of the thumbnail table is expressed by alphabet characters A to C while a column is expressed by a double-digit numerical character. The image data of the thumbnail table is described later with reference to FIG. 4.

FIG. 3A illustrates fifteen thumbnails in a front portion (portion near a left end) of the thumbnail table of FIG. 4. The CPU 100 displays a region corresponding to thumbnails 01A to 05C near the left end in the thumbnail table on the display surface 21c. A predetermined background image is displayed in a region where the thumbnail is not displayed (the same applies to FIGS. 3B to 3C).

When the user performs the flick in an arrow direction (left direction) at a position F on the display surface 21c of FIG. 3A, the CPU 100 scrolls the thumbnail table leftward at a speed corresponding to the performed flick based on a component in a horizontal direction (x-axis direction) of a vector expressed by the arrow. In the present embodiment, when the thumbnail table is scrolled in this manner, more thumbnails are displayed on the display surface 21c compared with the case in which the thumbnail table is not scrolled.

FIG. 3B is a view illustrating contents on the display surface 21c when the flick is performed. In the timing of FIG. 3B, twenty-one thumbnails 03A to 09C, that are being scrolled as described above, are displayed on the display surface 21c. When the scroll speed exceeds a predetermined speed, the CPU 100 displays the thumbnail table on the display surface 21c such that the thumbnail table seems to be curved as illustrated in FIG. 3B. That is, the CPU 100 generates the image in which the thumbnail table seems to be cylindrically curved in a depth direction, and displays the generated image on the display surface 21c. The CPU 100 performs scroll display by repeating the generation and the display of the image. Each thumbnail is reduced, and displayed so as to move leftward (see a broken-line arrow of FIG. 3B) along the curved surface.

The CPU 100 changes the scroll speed of the thumbnail table based on the component in the x-axis direction of the speed at which the finger or the contact member traces the display surface 21c. When the scroll speed is equal to or lower than the predetermined speed, the thumbnail table is scrolled while remaining in the state of FIG. 3A.

As described above, the processing for selecting one of the two kinds of the display modes is performed in displaying the thumbnail table on the display surface 21c. One of the display modes is a "normal mode" in which the thumbnail table is displayed while flat as illustrated in FIG. 3A. The other display mode is a "scan mode" in which the thumbnail table is displayed while curved as illustrated in FIG. 3B.

In addition to the case in which the thumbnail table is displayed in the display form of FIG. 3A while remaining still, the "normal mode" includes the case in which the thumbnail table is displayed in the display form of FIG. 3A while moving at a speed of the predetermined speed or less (low speed). In addition to the case in which the thumbnail table is displayed in the display form of FIG. 3B while moving at a speed exceeding the predetermined speed (high speed), the "scan mode" includes the case in which the thumbnail table is displayed in the display form of FIG. 3B while remaining still.

The normal mode is suitable for taking a closer look at each thumbnail in the still state. The scan mode is suitable for searching the thumbnail group including the desired image while the user takes a look at the whole thumbnail group during the scroll.

When the CPU 100 scrolls the thumbnail table based on the performed flick as illustrated in FIG. 3B, the CPU 100 continues the inertial scroll in the left direction unless the user further performs the input operation to the display surface 21c. The CPU 100 displays the thumbnail table on the display surface 21c such that the thumbnail table moves leftward while the scroll speed is gradually reduced. Then, the CPU 100 finally stops the movement of the thumbnail table.

Figure 3C:
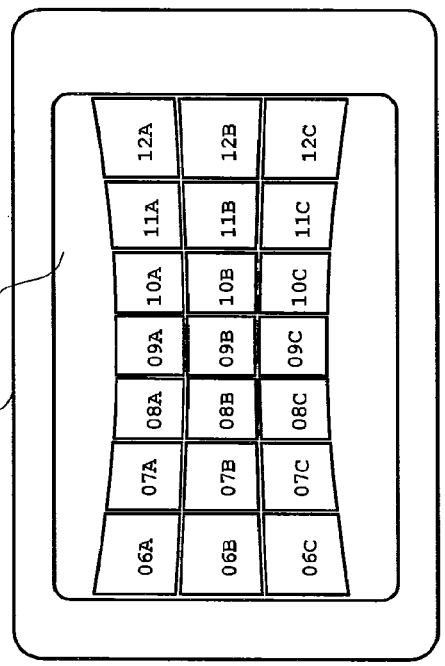

FIGS. 3C and 3D are views schematically illustrating contents displayed on the display surface 21c immediately before and immediately after the display modes are changed. The CPU 100 sets the display mode from the scan mode to the normal mode on the condition that the scroll speed is low and the condition that the user does not perform the input operation. For example, as illustrated in FIG. 3C, when the conditions are satisfied while the CPU 100 displays the thumbnails 06A to 12C on the display surface 21c in the scan mode, the CPU 100 changes the display mode from the scan mode to the normal mode. The CPU 100 then displays the thumbnails 07A to 11C on the display surface 21c in the normal mode as illustrated in FIG. 3D. The thumbnails 06A to 06C and 12A to 12C, which are displayed on the left side and the right side of the display surface 21c in the scan mode (FIG. 3C), are not displayed after the display mode is changed to the normal mode (FIG. 3D).

FIG. 4 is a view describing the image data of the thumbnail table of the present embodiment.

The CPU 100 arrays sixty thumbnails 01A to 20C into the 3-by-20 matrix to generate the image data of the thumbnail table, and writes the generated image data in the memory 200.

In generating the image data of the thumbnail table, a predetermined interval is provided between the thumbnails. A transparent color is specified in the interval portion and at a periphery of the thumbnail group. Accordingly, while the thumbnail table is displayed on the display surface 21c, a predetermined background image is displayed on the display surface 21c in the portion in which the thumbnail is not displayed.

The CPU 100 controls the image processing circuit 311 such that data corresponding to a region Sa (thumbnails 01A to 05C) of FIG. 4 is written in a predetermined region of the VRAM, thereby performing display processing for displaying the thumbnails on the display surface 21c as illustrated in FIG. 3A. Similarly, the CPU 100 controls the image processing circuit 311 such that data corresponding to a region Sd (thumbnails 07A to 11C) of FIG. 4 is written in a predetermined region of the VRAM, thereby performing display processing for displaying the thumbnails on the display surface 21c as illustrated in FIG. 3D.

As illustrated in FIG. 3B, the CPU 100 controls the image processing circuit 311 such that data corresponding to a region Sb (03A to 09C) of FIG. 4 written in each address of a region of the memory 200 is mapped in the corresponding address of a predetermined region of the VRAM according to a predetermined rule, thereby generating the image data of the thumbnail table in the curved state. For example, the image data may be generated using a texture mapping technique. That is, the CPU 100 virtually pastes the image data in the region Sb on a virtually stereoscopic object, which is cylindrically curved in the depth direction of the display surface 21c, as illustrated in FIG. 3B. The CPU 100 generates the image such that the image pasted on the virtually stereoscopic object is projected onto a plane in a predetermined position. Therefore, the image of FIG. 3B is displayed on the display surface 21c. The image data displayed in FIG. 3C is similarly generated. The CPU 100 may directly perform the processing for generating the image data without interposing the image processing circuit 311.

Control processing for scrolling the thumbnail table will be described below.

FIG. 5A is a flowchart illustrating the control processing for scrolling the thumbnail table. FIG. 5B is a table describing parameters used to display the thumbnail table.

When the user performs the thumbnail table displaying operation in order to browse the image, the CPU 100 starts processing illustrated by the flowchart of FIG. 5A. The flowchart of FIG. 5A mainly includes loop processing in steps S102 to S106. The loop processing in steps S102 to S106 is repeatedly performed in each predetermined time Δt using the timer 304.

When the loop processing in steps S102 to S106 is performed, display setting parameters are updated in S105. When the thumbnail table is scrolled, the display setting parameters are changed from those of the previous loop processing in the predetermined time Δt before. Therefore, the thumbnail table displayed on the display surface 21c is caused to transition. When the thumbnail table is not scrolled, the display setting parameters are equal to those of the previous loop processing in the predetermined time Δt before. When the thumbnail table is displayed, the display modes (the normal mode and the scan mode) are sequentially changed by the update of the display setting parameter.

First, the CPU 100 performs initial display processing in step S101. In step S101, the CPU 100 sets the display setting parameters to the default values of FIG. 5B. The CPU 100 then performs display processing for displaying the predetermined region of the thumbnail table on the display surface 21c according to the set display setting parameters. Finally, the CPU 100 resets the timer 304 that measures the predetermined time Δt.

The display setting parameters of FIG. 5B are mainly used to perform the scroll display of the thumbnail table or to select the display mode. The display setting parameters include a touch state, touch coordinates, a screen center coordinate, and a scroll speed.

A touch state f indicates whether the display surface 21c is touched, namely, whether an object to be detected such as the finger or the contact member is in contact with the display surface 21c. The touch state f is 0 when the object to be detected is not in contact with the display surface 21c, and the touch state f is 1 when the object to be detected is in contact with the display surface 21c. The touch state f has the default value of 0.

The touch coordinates indicates coordinates (x, y) at a position in which the object to be detected is in contact with the display surface 21c.

Figure 6A:
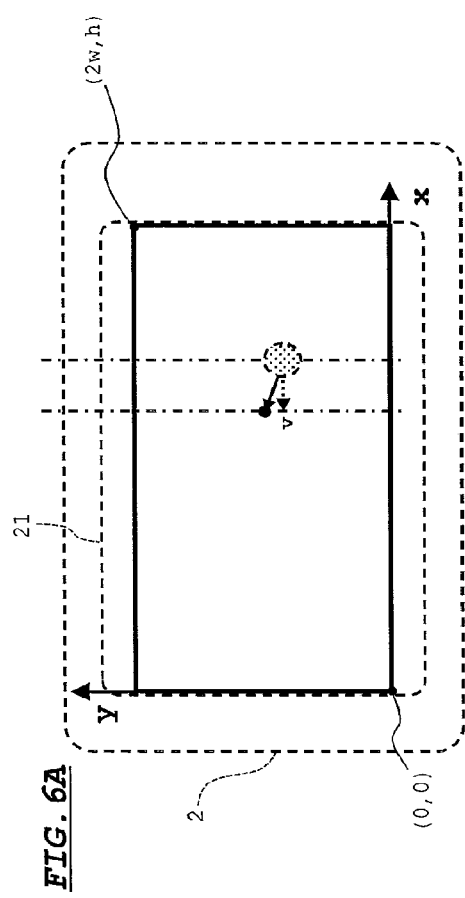
FIGS. 6A and 6B are views describing a region where the image data of the embodiment is displayed on the display surface.
Figure 6B:
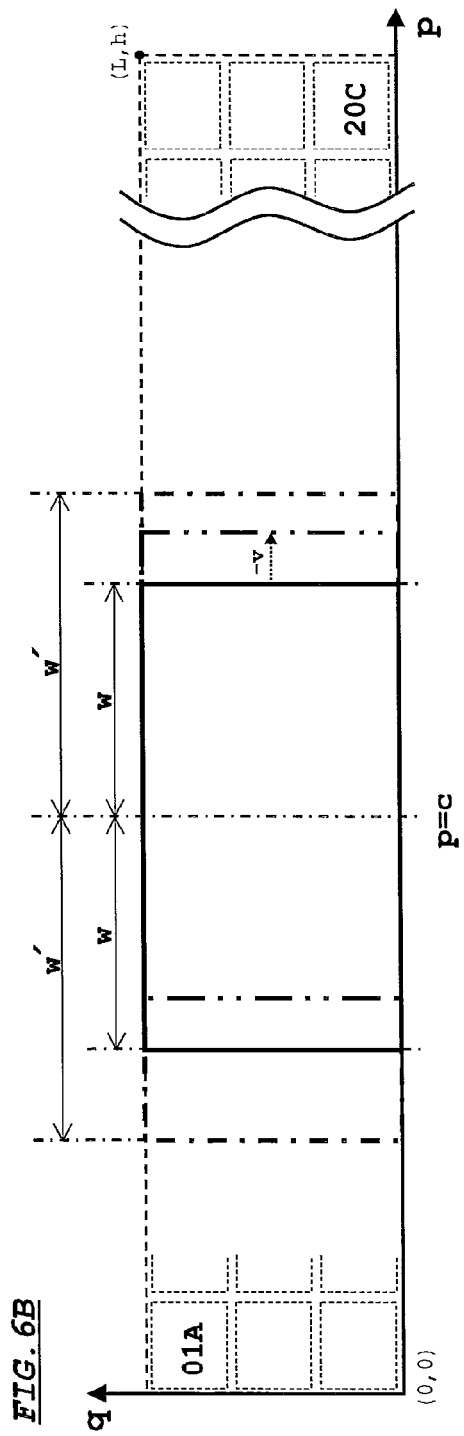

FIG. 6A illustrates a coordinate space of a region where the thumbnail table is displayed on the display surface 21c. FIG. 6B illustrates a coordinate space of the thumbnail table.

As illustrated in FIG. 6A, the region where the thumbnail table is displayed on the display surface 21c has a size of 2w (pixels)×h (pixels). It is assumed that x is a horizontal axis coordinate, y is a vertical axis coordinate, and an origin is a lower left corner of the region. The touch coordinate x may have a value in a range of $0 \le x \le 2w$. The touch coordinate y may have a value in a range of $0 \le y \le h$. The touch coordinates are set only when the display surface 21c is touched (f=1) (see S103). The default value of the touch coordinates (x, y) is not set.

Referring to FIG. 5B, the screen center coordinate c is a value that specifies which region of the thumbnail table is displayed on the display surface 21c. The screen center coordinate c has the default value of w.

It is assumed that the thumbnail table of FIG. 6B has a size of L (pixels)×h (pixels). It is assumed that p is a horizontal axis coordinate, q is a vertical axis coordinate, and an origin is a lower left corner of the region. The screen center coordinate c is a p-axis coordinate of a center point in the region of the thumbnail table, which is displayed on the display surface 21c.

In the normal mode, the screen center coordinate c means that the CPU 100 displays the region of $c-w \le p \le c+w$ and $0 \le q \le h$ of the thumbnail table on the display surface 21c. In the scan mode, the screen center coordinate c means that the CPU 100 displays the region of $c-w' \le p \le c+w'$ (w<w') and $0 \le q \le h$ of the thumbnail table on the display surface 21c. However, in the scan mode, after the image having a width of 2w as illustrated in FIG. 3C is generated, the generated image is displayed on the display surface 21c.

For the sake of convenience, the description of the range in a q-axis direction may be omitted in setting the region displayed on the display surface 21c. In such cases, the range in the q-axis direction is set to $0 \le q \le h$ as described above (in both the normal mode and the scan mode).

For example, when the screen center coordinate c is located in the p-coordinate of FIG. 6B in the normal mode, the region surrounded by a thick line is displayed on the display surface 21c. Similarly, when the screen center coordinate c is set in the scan mode, the image having the width of 2w, which is generated based on the image data of the region surrounded by a thick alternate long and short dash line, is displayed on the display surface 21c.

In the present embodiment, w is substantially equal to 2.5 times the horizontal width (the number of pixels) of each thumbnail, and w' is substantially equal to 1.4 times w. Accordingly, in the normal mode, the thumbnails of five columns are displayed as illustrated in FIGS. 3A and 3D. In the scan mode, the thumbnails of seven columns (=1.4×5) are displayed as illustrated in FIGS. 3B and 3D. It is not always necessary that w and w' be set in the above manner. For example, in order to display more thumbnails in the scan mode, w and w' may be set such that a ratio of w'/w is larger than 1.4. In order to enhance visibility of each thumbnail, w and w' may be set such that the ratio of w'/w is lower than 1.4.

Referring to FIG. 5B, a scroll speed v indicates a speed at which the thumbnail table is scrolled (pixel/second). The scroll speed v has the default value of 0.

As described below, when the flick or the slide is performed rightward, the scroll speed v is set to a positive value. When the flick or the slide is performed leftward, the scroll speed v is set to a negative value.

A display mode m indicates whether the display mode is the normal mode (m=0) or the scan mode (m=1). The display mode m has the default value of 0.

In the display processing in step S101, as illustrated in FIG. 3A, the CPU 100 displays the region of $0 \le p \le 2w$ (c=w) and $0 \le c \le h$ of the thumbnail table on the display surface 21c in the still state (v=0) and in the normal mode (m=0).

In this manner, the initial display processing in step S101 is performed, and then the loop processing in steps S102 to S106 is repeatedly performed.

In steps S103 to S105, the CPU 100 mainly performs processing for updating the display setting parameters. In the processing of step S106, the CPU 100 performs the display processing for displaying the predetermined region of the thumbnail table on the display surface 21c based on the newly-updated display setting parameter. Therefore, the image is displayed on the display surface 21c in each predetermined time Δt based on the new display setting parameters.

Hereinafter, for the sake of convenience, the parameters f, x, y, c, v, and m in the current loop processing are expressed by f1, x1, y1, c1, v1, and m1, and the parameters f, x, y, c, v, and m in the previous loop processing are expressed by f0, x0, y0, c0, v0, and m0.

In step S102, the CPU 100 reads the previous display setting parameters m0, f0, c0, x0, y0, and v0. The previous display setting parameters indicate display setting parameters that are set in performing the previous loop processing in steps S102 to S106. However, when the processing in step S102 is performed immediately after step S101, the previous display setting parameters indicate display setting parameters that are set to the default values of FIG. 5B.

Next, the processing for detecting the current touch state is performed in step S103. The CPU 100 detects whether the display surface 21c is currently touched (f1=1) or not (f1=0). When the display surface 21c is currently touched (f1=1), the CPU 100 sets the current touch coordinates (x1, y1) to the coordinates of the input position. When the display surface 21c is released (f1=0), the values of the touch coordinates (x1, y1) are not set. In the following processing, the parameters x1 and y1 are used in the case of f1=1.

When the processing in step S103 is completed as described above, the CPU 100 performs image selecting operation detection processing (S104).

FIGS. 7A and 7B are flowcharts illustrating the control processing of the present embodiment.

FIG. 7A is the flowchart illustrating the procedure of the image selecting operation detection processing (S104). In step S111, the CPU 100 determines what the previous display mode m0 is (see S102). When the previous display mode is the scan mode (m0=1 in S111), the CPU 100 ends the processing of FIG. 7A and goes to the processing in step S105 of FIG. 5A. When the previous display mode m0 is the normal mode (m0=0 in S111), the CPU 100 goes to determination processing in step S112.

In step S112, the CPU 100 determines whether the user has tapped one of the thumbnails displayed on the display surface 21c. In other words, the CPU 100 determines whether the user has performed an operation to tap the display surface 21c (f0=1, f1=1, and a time length in which the display surface 21c is touched is shorter than a predetermined time). When the tap operation has been performed, the CPU 100 determines whether the previous touch coordinates (x0, y0) are located on the thumbnail displayed on the display surface 21c. When one of these conditions is not satisfied, the CPU 100 determines that the thumbnail has not been tapped (NO in S112), and the CPU 100 ends the processing of FIG. 7A and performs the processing in next step S105.

When determining that a certain thumbnail has been tapped (YES in S112), the CPU 100 starts an image display program in order to display the image corresponding to the tapped thumbnail. Then, the processing for performing the scroll display of the thumbnail table of the flowchart of FIG. 5A is ended.

Referring to FIG. 5A, display setting parameter updating processing is performed in step S105. In this processing, the new screen center coordinate c1, the scroll speed v1, and the display mode m1 are fixed as follows.

FIG. 7B is the flowchart illustrating the procedure of the display setting parameter updating processing in S105. In step S121 of FIG. 7B, the CPU 100 sets the new scroll speed v1 and the new screen center coordinate c1. In next step S122, the CPU 100 performs the processing for properly correcting the new scroll speed v1 and the new screen center coordinate c1. Finally, in step S123, the CPU 100 performs the processing for selecting the new display mode m1.

FIG. 8 is the flowchart illustrating the procedure of the processing for calculating the speed and the position in S121.

First, the CPU 100 determines whether the current touch state is a released state (f1=0) or a touched state (f1=1) (S131). When the current touch state is the released state (f1=0 in S131), the CPU 100 sets the new scroll speed v1 as a value in which a predetermined value is subtracted from the scroll speed v0 in order to reduce the scroll speed of the thumbnail table (S132). However, the scroll speed v1 is set to 0 when an absolute value of the scroll speed v0 is equal to or lower than a predetermined threshold (including the case of v0=0).

For example, the CPU 100 sets the scroll speed v1 of the thumbnail table to a value in which a predetermined value is subtracted from the scroll speed v0 such that the scroll speed of the thumbnail table seems to be reduced by receiving a frictional resistance force. Alternatively, the CPU 100 may set the scroll speed v1 of the thumbnail table to a value in which a value of a predetermined rate of the scroll speed v0 is subtracted from the scroll speed v0 such that the scroll speed of the thumbnail table seems to be reduced by receiving an air resistance force. Alternatively, another method may be adopted such that the two methods for reducing the scroll speed are combined.

When the current touch state is the touched state (f1=1 in S131), the CPU 100 goes to next determination processing in step S133. In step S133, the CPU 100 determines whether the previous touch state is the released state (f0=0) or the touched state (f0=1).

When the previous touch state is the released state (f0=0 in S133), the CPU 100 sets the scroll speed v1 to 0 such that the scroll of the thumbnail table is stopped (S134). When the previous touch state is the touched state (f0=1 in S133), the CPU 100 sets the new scroll speed v1 according to the slide (S135). That is, the CPU 100 sets the new scroll speed v1 to $(x1-x0)/\Delta t$.

For example, when the slide is performed rightward, the scroll speed v1 is set to a positive value because of x1>x0. When the slide is performed leftward, the scroll speed v1 is set to a negative value because of x1<x0.

Thus, the new scroll speed v1 is set in one of the pieces of processing in steps S132, S134, and S135.

When one of the pieces of processing in steps S132, S134, and S135 is completed, the CPU 100 sets the new screen center coordinate c1 in step S136. The new screen center coordinate c1 is set by an equation of $c1=c0-v1 \times \Delta t$. By setting the screen center coordinate c1 in this manner, the CPU 100 displays, when the next display processing (S106) is performed, the thumbnail table on the display surface 21c such that the thumbnail table seems to move in the same direction as the direction in which the flick or the slide is performed.

When the processing in step S136 is ended, the processing for calculating the speed and the position of FIG. 8 (S121 of FIG. 7B) is completed.

Referring to FIG. 7B, the CPU 100 performs correction processing in S122. The correction processing is performed to the scroll speed v1 and the screen center coordinate c1, which are set in the processing of FIG. 8. In the case of c1<0 in step S122, the CPU 100 performs the correction processing such that c1=0 and v1=0 are obtained. In the case of c1>L, the CPU 100 performs the correction processing such that c1=L and v1=0 are obtained. Therefore, the correction processing in step S122 is completed. When c1<0 or c1>L is not obtained, the correction processing is not performed to the scroll speed v1 and the screen center coordinate c1, and the scroll speed v1 and the screen center coordinate c1 which are set through the processing of FIG. 8 are used as is. In this manner, the region displayed on the display surface 21c is prevented from falling outside the thumbnail table. That is, even if the display target region reaches the vicinities of the right and left ends of the thumbnail table, at least the range of w or w' from the right and left ends of FIG. 6B is left on the display surface 21c.

When the processing in step S122 is ended, the CPU 100 then performs display mode selecting processing (S123).

FIG. 9 is a flowchart illustrating the procedure of the display mode selecting processing.

First, the CPU 100 determines whether the previous display mode is the normal mode (m0=0) or the scan mode (m0=1) (S141).

When the previous display mode m0 is the normal mode (m0=0 in S141), the CPU 100 determines whether an absolute value |v1| of the new scroll speed v1 exceeds a predetermined value va (S142). In the case of |v1|>va (YES in S142), the CPU 100 sets the display mode m1 to 1 such that the display mode is caused to transition to the scan mode (S143). In the case of |v1|≤va (NO in S142), the CPU 100 does not change the display mode. That is, the CPU 100 set the display mode m1 to m0 (in this case, m1=0) (S144). When the processing in step S143 or S144 is ended, the CPU 100 ends the display mode selecting processing of FIG. 9.

On the other hand, when the previous display mode m0 is the scan mode (m0=1 in S141), the CPU 100 determines whether the absolute value |v1| of the new scroll speed v1 is equal to or lower than a predetermined value vb (S145). For example, the predetermined value vb is a numerical value of 0≤vb≤va. In the case of |v1|>vb (NO in S145), the CPU 100 does not change the display mode. That is, the CPU 100 sets the display mode m1 to m0 (in this case, m1=1) (S144).

In the case of |v1|≤vb (YES in S145), the CPU 100 goes to determination processing in step S146. In step S146, the CPU 100 determines whether the current touch state is the touched state (f1=1) or the released state (f1=0).

When the current touch state is the touched state (f1=1 in S146), the CPU 100 does not change the display mode, but sets the display mode m1 to m0 (in this case, m1=1) (S144). When the current touch state is the released state (f1=0 in S146), the CPU 100 sets the display mode m1 to 0 such that the display mode is caused to transition to the normal mode (S147). When the processing in step S147 is ended, the display mode selecting processing (S123) of FIG. 9 is completed, and the display setting parameter updating processing (S105) of FIG. 7B is completed. In this manner, the display mode selecting processing of FIG. 9 is performed.

Referring to FIG. 5A, when the display setting parameter updating processing in step S105 is completed, the CPU 100 performs display processing in next step S106. The CPU 100 performs the processing for displaying a certain region of the thumbnail table on the display surface 21c based on the newly-set display setting parameters as follows.

FIG. 10 is a flowchart illustrating the procedure of the display processing (S106).

The CPU 100 determines whether the new display mode m1 is the normal mode (m1=0) or the scan mode (m1=1) (S151).

When the new display mode m1 is the normal mode (m1=0 in S151), the CPU 100 performs display processing in step S152. In step S152, the CPU 100 displays on the display surface 21c the image of the region whose horizontal axis (p-coordinate) of the thumbnail table has a range of c1−w≤p≤c1+w. The display processing (S106) is performed similarly to the display processing for displaying the region on the display surface 21c in step S101.

For example, in the case of c1=w, the thumbnails 01A to 05C are displayed on the display surface 21c as illustrated in FIG. 3A. For example, when the p-coordinate c2 of FIG. 4 is set to the new screen center coordinate, namely, in the case of c1=c2, the thumbnails 07A to 11C are displayed on the display surface 21c as illustrated in FIG. 3D.

When the new display mode m1 is the scan mode (m1=1 in S151), the CPU 100 performs processing in step S153. As described above, the CPU 100 causes the image processing circuit 311 to generate the new curved image having the width of 2w from the image of the region whose horizontal coordinate of the thumbnail table is in the range of c1−w'≤p≤c1+w'. The CPU 100 displays the generated image on the display surface 21c. In this manner, the processing in step S153 is performed.

For example, when the p-coordinate c2 of FIG. 4 is set to the new screen center coordinate in the scan mode, namely, in the case of c1=c2, the thumbnails 06A to 12C are displayed on the display surface 21c as illustrated in FIG. 3C.

When the processing in step S152 or S153 is completed, the CPU 100 ends the display processing (S106 of FIG. 5A) of FIG. 10. When the display processing in step S106 is ended, the CPU 100 is on standby until a period time Δt of the loop processing elapses. When the period time Δt has elapsed, the CPU 100 resets the timer 304 and goes to the processing in step S102. In this manner, the pieces of processing of the flowchart illustrated in FIG. 5A are performed.

As described above, the processing for displaying the thumbnail table and the processing for scrolling the thumbnail table of FIG. 5A are repeatedly performed. At this time, the thumbnail table is displayed according to the display mode that is updated as needed.

In some cases, the user may not perform the touch while the pieces of processing of FIG. 5A are performed. For example, the user may not perform the touch after the initial display processing S101 is performed. In such cases, the CPU 100 continues the display (screen center coordinate w, scroll speed 0, and display mode 0) of FIG. 3A.

There may also be cases where the user does not perform the touch after the scroll display of the thumbnail table of FIG. 3B is performed in the scan mode at the predetermined scroll speed v (|v|>vb) in response to the flick. In such cases, while setting the scroll speed to be gradually reduced (S132), the CPU 100 repeats the loop processing in steps S102 to S106 of FIG. 5A such that the scroll is performed in the scan mode.

When the CPU 100 repeats the loop processing in steps S102 to S106, the absolute value |v| of the scroll speed eventually becomes vb or less. For example, when the absolute value |v| becomes vb or less while the thumbnail table is displayed in the scan mode as illustrated in FIG. 3C, the CPU 100 causes the display mode to make transition to the normal mode (S147). As illustrated in FIG. 3D, the CPU 100 displays the thumbnail table in the normal mode.

Meanwhile, there may be cases where the user touches the display surface 21c while the scroll display of the thumbnail table is performed in the scan mode in response to the flick as described above. In such cases, the CPU 100 stops the scroll of the thumbnail table in the scan mode. Then, the CPU 100 displays the thumbnail table in the scan mode while the user continuously touches the display surface 21c (f1=1 in S146). When the user performs the slide while continuously touching the display surface 21c, the CPU 100 moves the thumbnail table according to the slide in the scan mode (see S135 and S136).

There may be cases where the user performs the slide at a speed lower than the predetermined value va while the current touch state is the normal mode. In such cases, since it is determined as NO in the processing in step S142, the CPU 100 scrolls the thumbnail table in the normal mode. Thereafter, when the slide speed exceeds the predetermined value va, the CPU 100 changes the display mode to the scan mode (YES in S142), and the CPU 100 scrolls the thumbnail table in the scan mode.

When the display processing in step S106 is performed, the screen center coordinate is set to a value in a range of 0 to L by performing the correction processing in step S122. For example, when the screen center coordinate is L, a right side boundary of the thumbnail table is displayed on the display surface 21c in the display processing in step S106.

FIGS. 11A and 11B are views schematically illustrating the display state of the thumbnail table when the screen center coordinate is L. FIG. 11A illustrates the display state in the scan mode. FIG. 11B illustrates the display state in the normal mode.

As illustrated in FIGS. 11A and 11B, when the screen center coordinate is L, part of the thumbnail table is displayed only in a left-side half portion of the display surface 21c. In the scan mode, as illustrated in FIG. 11A, the right-side half portions of the thumbnails 17A to 17C and the thumbnails 18A to 20C are displayed in the left-side half region of the display surface 21c. In the normal mode, as illustrated in FIG. 11B, the right-side half portions of the thumbnails 18A to 18C and the thumbnail 19A to 20C are displayed in the left-side half region of the display surface 21c.

The CPU 100 performs the scroll display so as to move the thumbnail table to the left side on the display surface 21c, whereby sometimes the screen center coordinate is set to L as illustrated in FIG. 11A. In such cases, the scroll speed is also set to 0 through the correction processing in step S122. Accordingly, when the user releases the finger or the touch member from the display surface 21c, the display mode is changed to the normal mode (S147). That is, the CPU 100 changes the display contents to the display of FIG. 11B.

As described above, according to the present embodiment, when the scroll speed exceeds the predetermined speed while the thumbnail table is scrolled, the CPU 100 causes the display mode to transition from the normal mode to the scan mode. In the scan mode, more thumbnails than those of the normal display (see FIG. 3A) are displayed on the display surface 21c.

When the user scrolls the thumbnail table in order to search the image to be browsed, more thumbnails may be browsed at once in the scan mode. Therefore, the user may easily find the desired image using the scroll function. When the user searches for the desired thumbnail group while referring to the whole of the plurality of thumbnail groups, the display in the scan mode allows the user to browse more thumbnail groups at once to smoothly search the desired thumbnail group.

When the user does not perform the touch or when the scroll speed is low, the display mode is automatically changed from the scan mode to the normal mode. Therefore, when the scroll speed is reduced in order that the user may clearly confirm each thumbnail or the like, the thumbnail is automatically displayed in the normal mode to improve the convenience.

In the case where the user performs the touch while the display mode is the scan mode, and the user continuously touches the fingertip on the display surface 21c, the display mode does not transition to the normal mode. Therefore, the user may see the thumbnail table displayed in the scan mode while the display mode is maintained in the scan mode. Additionally, the user may scroll the thumbnail table, which is displayed in the scan mode, by the slide operation. When the user wants to see the thumbnail in the normal mode, the user has only to release the fingertip from the display surface 21c.

In the present embodiment, in the scan mode, the thumbnail displayed near the right and left ends of the display surface 21c, namely, the thumbnail immediately after the display on the display surface 21c is larger than the thumbnail displayed near the center. Accordingly, in performing the scroll display of the thumbnail table in the scan mode, the user may browse the thumbnail immediately after the display on the display surface 21c in the vicinities of the right and left ends of the display surface 21c and in the size substantially equal to that of the display in the normal mode, whereby the user may smoothly search the desired thumbnail.

<First Modification>

FIG. 12 is a flowchart illustrating a procedure of control processing according to a first modification. The flowchart of FIG. 12 is a modification example of the flowchart indicating the procedure of the display mode selecting processing of FIG. 9. The flowchart of FIG. 12 is obtained by deleting the processing in step S146 from the flowchart of FIG. 9.

When determining that the absolute value |v1| of the scroll speed v1 is equal to or lower than the predetermined value vb in the processing in step S145 (YES in S145), the CPU 100 changes the display mode from the scan mode (m=1) to the normal mode (m=0). At this time, whether the user performs the touch or not, the display mode is changed to the normal mode.

In this modification, when the scroll speed exceeds the predetermined speed while the thumbnail table is scrolled, the display mode is caused to transition from the normal mode to the scan mode, and more thumbnails are displayed compared with the normal display.

Further, in this modification, the display mode is changed according to the scroll speed. Therefore, when the user performs the slide while touching the display surface 21c with the fingertip, the display mode is automatically changed according to the slide speed. That is, the thumbnail table is automatically displayed in the normal mode when the user stops the fingertip, and the thumbnail table is automatically displayed in the scan mode when the user performs the slide.

<Second Modification>

Figure 13B:
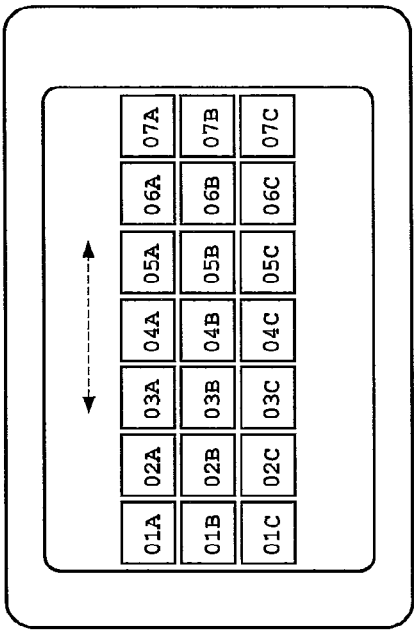
FIGS. 13A to 13D are views schematically illustrating contents according to second to fifth modifications displayed on the display surface.
Figure 13D:
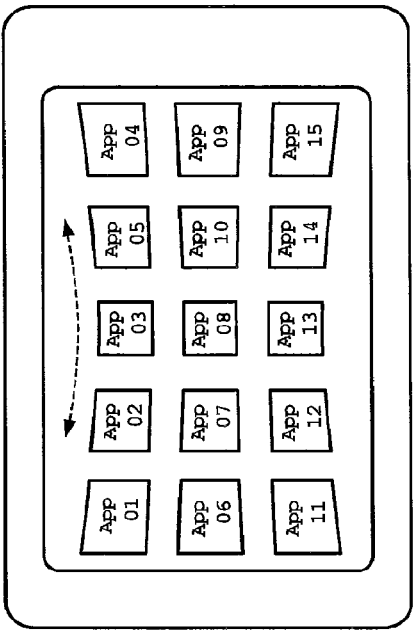
Figure 13A:
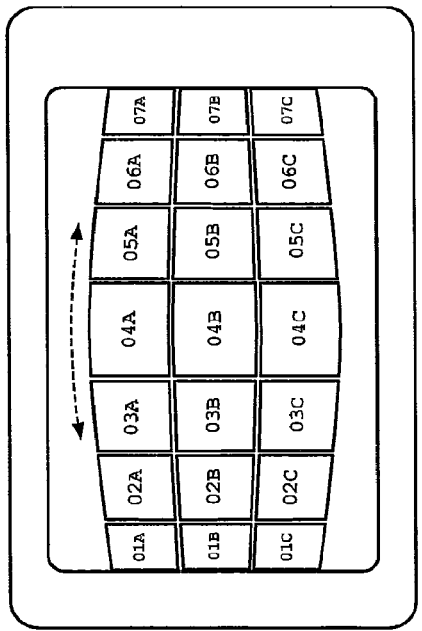

FIG. 13A is the views illustrating example in which thumbnail tables according to second to fifth modifications are displayed on the display surface.

FIG. 13A is the view illustrating display contents of the thumbnail table of the second modification in the scan mode. In the above embodiment, when the display mode is the scan mode, the thumbnail table that seems to be curved toward the depth direction of the display surface 21c is displayed on the display surface 21c. However, it is not always necessary that the thumbnail table displayed on the display surface 21c in the scan mode seem to be curved toward the depth direction of the display surface 21c. In the second modification, the image data of the thumbnail table that seems to be curved toward the front direction of the display surface 21c is generated as illustrated in FIG. 13A. In the scan mode, the CPU 100 displays the thumbnail table, that seems to be curved toward the front direction of the display surface 21c, on the display surface 21c based on the image data. In FIG. 13A, twenty-one thumbnails 01A to 07C, which are 1.4 times the thumbnails in the normal mode, are displayed on the display surface 21c.

In the second modification as well, the scroll display of more images may be performed in the scan mode.

<Third Modification>

FIG. 13B is the view illustrating display contents of the thumbnail table of the third modification in the scan mode. In the above embodiment, in the scan mode, the image in which the thumbnail table seems to be curved is displayed on the display surface 21c. However, it is not always necessary that the image displayed on the display surface 21c in the scan mode be limited to the image that seems to be curved. In this modification, as illustrated in FIG. 13B, the image in which the thumbnail table is not curved but reduced is displayed on the display surface 21c. In FIG. 13B, twenty-one thumbnails 01A to 07C, which are 1.4 times the thumbnails in the normal mode, are displayed on the display surface 21c.

In this modification as well, more thumbnails may be scrolled in the scan mode.

<Fourth Modification>

Figure 13C:
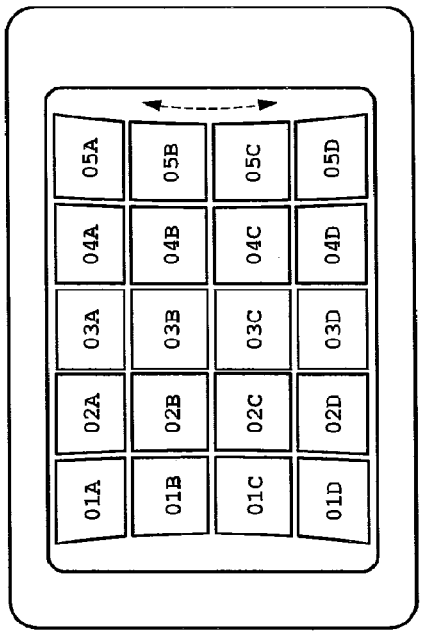

FIG. 13C is the view illustrating display contents of the thumbnail table of the fourth modification in the scan mode. In this modification, the thumbnail table is constructed by sixty thumbnails 01A to 05L having 12-by-5 matrix. In the above embodiment, the scroll direction of the thumbnail table is the x-axis direction (horizontal direction) of FIG. 6A. However, it is not always necessary that the scroll direction be limited to the x-axis direction. In this modification, as illustrated in FIG. 13C, the thumbnail table is scrolled in the y-axis direction (vertical direction). That is, in the scan mode, the thumbnail table is caused to transition along the curved surface in the y-axis direction as illustrated in FIG. 13C. In FIG. 13C, twenty-one thumbnails 01A to 05D, which are 4/3 times the thumbnails in the normal mode, are displayed on the display surface 21c.

In this modification as well, more images may be scrolled in the scan mode.

<Fifth Modification>

FIG. 13D is the view illustrating display contents of the icons of the fifth modification in the scan mode. The mobile phone of this modification includes a function of displaying the icon groups for starting the applications while the icon groups are arrayed (in this modification, 3-by-4 matrix), i.e., what is called a launcher screen. When the user taps the desired icon, the application corresponding to the icon is started. In the case of the many icons, or in the case that the icons are disposed while divided into groups, the user slides the display surface 21c to perform the scroll display of the icon groups in the horizontal direction, and the user may find the desired application.

In the above embodiment, the scroll display of the thumbnail table is performed in the two display modes. It is not always necessary that the thumbnail table be the target that is displayed in the two display modes. In this modification, as illustrated in FIG. 13D, in performing the scroll display of the icon groups, the icon groups are displayed on the display surface 21c such that the icon groups seem to be curved in the depth direction of the display surface 21c similarly to the above embodiment.

As illustrated in FIG. 13D, in the scan mode, fifteen (3-by-5) icons, which are 1.25 times the icons in the normal mode, are displayed on the display surface 21c.

In this modification as well, the scroll display of more images may be displayed in the scan mode. Therefore, the user may simply find the desired application by performing the scroll display of the icon groups in the scan mode.

<Others>

In the above embodiment and the fourth modification, the scroll direction is the vertical direction or the horizontal direction. However, the scroll direction is not necessarily limited to the vertical direction or the horizontal direction. For example, the two display modes (normal mode and scan mode) may be switched when the display target image is displayed scrollable in a two-dimensional direction. In this case, there is generated an image in which the region larger than the region of the display target image displayed in the normal mode is reduced to the size suitable for the display surface 21c, and the generated image is displayed on the display surface 21c in the scan mode. Simple reduction processing may also be performed in generating the image. Alternatively, in addition to the simple reduction processing, for example, an image curved in the depth direction of the display surface 21c is formed into a cylindrical shape or a spherical shape (the spherical surface is seen from the inside of the sphere) in a virtual three-dimensional space, and a 3D-image may be generated. The scroll direction may be one dimension, or the scroll direction may be an oblique direction in addition to the vertical direction or the horizontal direction. For example, the scroll direction may be curved into an arc shape rather than a linear shape.

In the above embodiment and the modifications, the thumbnails of the images or the icons of the applications are scrolled while vertically and horizontally arrayed. Alternatively, for example, the thumbnails of the images or the icons of the applications may be arrayed so as to form a triangular lattice or a hexagonal lattice. Another array such as a non-periodic array or a random array may be used.

In the above embodiment, the processing for determining the change of the display mode is performed based on the predetermined threshold (va and vb) relating to the scroll speed and the touch state (f) (see FIG. 9). However, the processing for determining the change of the display mode is not necessarily limited to be performed based only on the scroll speed. Alternatively, for example, whether the state of |v1|≤vb is satisfied while continued for a predetermined time (for example, hundreds milliseconds) or more may be determined instead of making the determination of |v1|≤vb in the determination processing in step S145. Accordingly, the frequent change of the display mode is suppressed, and the visibility of the thumbnail table is improved during the scroll display.

In the above embodiment, the thumbnail table is displayed while the two kinds of the display methods (normal mode and scan mode) are properly switched according to the change of the display mode. Alternatively, the processing for changing the display mode may be performed such that a switching process may seem continuous in switching the display methods. For example, when the display in the scan mode of FIG. 3C is caused to transition to the display in the normal mode of FIG. 3D, an image that seems to be curved gentler than the curve of the thumbnail table of FIG. 3C is generated, and the image may be displayed before the thumbnail table of FIG. 3D is displayed. A plurality of images that express the transition of the display mode are generated such that a degree of the curve of the thumbnail table seems to be gradually and gently changed, and the degree of the curve of the thumbnail table may be caused to transition like animation by sequentially displaying the images on the display surface 21c.

In the above embodiment, the two kinds of the display modes, namely, the normal mode (m=0) and the scan mode (m=1) are set. However the display mode is not limited to the two kinds. For example, a plurality of display modes having five states corresponding to m=0, 0.25, 0.5, 0.75, and 1 may be dealt with according to the scroll speed. In this case, for example, the degree of the curve of the displayed thumbnail table may be changed according to the value of the display mode m. Alternatively, the value of the display mode m may not be discrete as described above, but may be a continuous value of 0 to 1.

In the above embodiment, the processing for correcting the scroll speed and the screen center coordinate is performed in step S122 of FIG. 7B. However, the correction processing is not limited to the contents described above. For example, further correction processing may be added to step S122 when the screen center coordinate c1 is located near the horizontal boundary of the thumbnail table (for example, c1<w or c1>L−w). For example, in the case of c1>L−w, the scroll center coordinate may exceed the upper limit L when the inertial scroll is continued at the scroll speed v1 at that time. The scroll speed v1 may be corrected small such that the scroll center coordinate does not exceed the upper limit L and such that the scroll is stopped before the screen center coordinate reaches the upper limit L. In this manner, the further correction processing is performed in step S122, whereby the CPU 100 may smoothly reduce the scroll speed of the thumbnail table and stop the scroll even if the user quickly performs the flick while the vicinity of the right side of the thumbnail table is displayed. Therefore, the visibility of the thumbnail table may be improved.

In the above embodiment, the scroll display is performed based on the touch in the display surface 21c, and the display mode is properly changed. The operation performed by the user is not limited to the touch in the display surface 21c. For example, the present invention may be applied when the user performs the operation to scroll the thumbnail table or the icon groups through the key input operation. The processing for switching the two display modes of the normal mode and the scan mode may be performed when the processing for performing the scroll display of the image such as the thumbnail table is performed using another input device or an equipped sensor.

In the above embodiment, the scroll display of the thumbnail table including the thumbnails in which the original images are reduced is performed in the normal mode and the scan mode. At this time, the original image is not limited to the image such as a photograph and an illustration, but the original image may be an image (image of electronic document) that is displayed on the display surface 21c when a more general electronic document is opened by a predetermined program. In this case, the thumbnail table includes an image in which the image of the electronic document is reduced (hereinafter referred to as "a thumbnail of an electronic document"). When the user performs the operation (such as the tap) to select the thumbnail of one electronic document while the thumbnail table is displayed on the display surface 21c, the CPU 100 starts the predetermined program in order to open the selected electronic document.

In the above embodiment, the present invention is applied to the slide type mobile phone. Alternatively, the present invention may be applied to any type of mobile phone such as a fold type mobile phone and a straight type mobile phone.

Further, the mobile terminal device of the present invention is not limited to the mobile phone, but the mobile terminal device may be the PDA (Personal Digital Assistant), the tablet PC, and the like.

Further, various modifications may be made to the embodiment of the present invention as needed within the technical idea of the invention as shown by the scope of the invention.

What is claimed is:

1. A mobile terminal device comprising:
a display;
a touch sensor configured to detect a touch input; and
at least one processor configured to, when the touch sensor detects a first input comprising a slide and release of a touch on an image group displayed on the display,
determine a moving speed of the first input,
after the moving speed of the first input exceeds a predetermined speed, cylindrically curve the image group in a depth direction by gradually changing a degree of the curve, so as to reduce a size of one or more images within a center of the image group, while maintaining a size of one or more images at two ends of the image group, to increase a number of images displayed within the image group on the display,
scroll the cylindrically-curved image group in accordance with the moving speed of the first input, and,
when the touch sensor detects a further touch input following the release of the first input and during the scrolling,
initially stop the scrolling and maintain the cylindrical curvature of the image group on the display, and,
until the further touch input is terminated, when the further touch input comprises a continuous slide, scroll the image group in accordance with the slide and maintain the cylindrical curvature of the image group.

2. The mobile terminal device according to claim 1, wherein the at least one processor is further configured to not cylindrically curve the image group but scroll the image group, when the moving speed of the first input is equal to or slower than the predetermined speed.

3. The mobile terminal device according to claim 1, wherein scrolling the cylindrically-curved image group in accordance with the moving speed of the first input comprises gradually decelerating a speed of the scrolling.

4. The mobile terminal device according to claim 3, wherein the at least one processor is further configured to remove the cylindrical curvature of the image group, so as to restore the size of the one or more images within the center of the image group to an original size and decrease the number of images displayed within the image group on the display when the speed of the scrolling becomes slower than a predetermined speed by the deceleration and the touch sensor does not detect the further touch input before the speed of the scrolling becomes lower than that predetermined speed.

5. The mobile terminal device according to claim 1, wherein the at least one processor controls the display such that, during scrolling of the image group, the image group appears to move along a cylindrical curved surface, which is curved about an axis perpendicular to a moving direction of the image group.

6. The mobile terminal device according to claim 1, wherein the image group includes an icon.

7. The mobile terminal device according to claim 1, wherein the image group includes a thumbnail of an electronic file.

8. The mobile terminal device according to claim 1, wherein the first input comprises a flick.

9. The mobile terminal device according to claim 3, wherein gradually decelerating a speed of the scrolling comprises, while approaching a limit of the image group, correcting the speed of the scrolling so that the scrolling does not exceed the limit of the image group.

10. The mobile terminal device according to claim 1, wherein the image group comprises a plurality of images arranged in a triangular lattice.

11. The mobile terminal device according to claim 1, wherein the image group comprises a plurality of images arranged in a hexagonal lattice.

12. The mobile terminal device according to claim 1, wherein the at least one processor cylindrically curves the image group as soon as the moving speed of the first input exceeds the predetermined speed for a predetermined time period.

* * * * *